United States Patent
Kegel

(10) Patent No.: US 9,015,374 B2
(45) Date of Patent: Apr. 21, 2015

(54) VIRTUAL INTERRUPT FILTER

(71) Applicant: Advanced Micro Devices, Inc., Sunnyvale, CA (US)

(72) Inventor: Andrew G. Kegel, Redmond, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/937,917

(22) Filed: Jul. 9, 2013

(65) Prior Publication Data

US 2015/0019765 A1 Jan. 15, 2015

(51) Int. Cl.
*G06F 3/00* (2006.01)
*G06F 5/00* (2006.01)
*G06F 13/24* (2006.01)

(52) U.S. Cl.
CPC ................................. *G06F 13/24* (2013.01)

(58) Field of Classification Search
None
See application file for complete search history.

(56) References Cited

U.S. PATENT DOCUMENTS

| | | | |
|---|---|---|---|
| 6,275,782 B1 | 8/2001 | Mann | |
| 8,478,924 B2 * | 7/2013 | Ahmad et al. | 710/267 |
| 2008/0114916 A1 | 5/2008 | Hummel et al. | |
| 2011/0197003 A1 | 8/2011 | Serebrin et al. | |
| 2011/0197004 A1 | 8/2011 | Serebrin et al. | |
| 2013/0080726 A1 | 3/2013 | Kegel et al. | |
| 2013/0125115 A1 | 5/2013 | Tsirkin et al. | |
| 2013/0145051 A1 | 6/2013 | Kegel et al. | |
| 2013/0145055 A1 | 6/2013 | Kegel et al. | |
| 2013/0159576 A1 | 6/2013 | Kegel et al. | |
| 2013/0159581 A1 | 6/2013 | Kegel et al. | |

OTHER PUBLICATIONS

TW Burger, "Intel Virtualization Technology for Directed I/O (VT-d): Enhancing Intel Platforms for efficient virtualization of I/O devices", Mar. 5, 2012, 8 pages, Intel Corporation.

Advanced Micro Devices, Inc., "AMD I/O Virtualization Technology (IOMMU) Specification", Mar. 24, 2011, 167 pages.

* cited by examiner

*Primary Examiner* — Kris Rhu
(74) *Attorney, Agent, or Firm* — Park, Vaughan, Fleming & Dowler, LLP

(57) ABSTRACT

A system for processing interrupts in a virtualized computing environment includes a virtual interrupt controller to provide virtual interrupts from peripherals to virtual machines. The system also includes a virtual interrupt filter that has an estimator circuit to provide an estimate of what proportion of interrupts from one or more of the peripherals are virtual interrupts. A determination is made as to whether the estimate satisfies a criterion; if it does, incoming interrupts are blocked.

20 Claims, 12 Drawing Sheets

VIRTUAL INTERRUPT FILTER

TECHNICAL FIELD

The present embodiments relate generally to virtualized computing systems, and more specifically to processing interrupts in virtualized computing systems.

BACKGROUND

Peripherals in a computer system generate interrupts to notify the processor of events that merit the processor's attention. In a virtualized computing system, the interrupts include virtual interrupts directed to guest operating systems running on virtual machines. A virtual interrupt controller delivers the virtual interrupts to the guest operating systems, thereby offloading interrupt processing from the hypervisor and improving system performance. However, a bug, attacking program, or other anomaly may cause one or more peripherals to generate an excessive number of virtual interrupts, degrading system performance and potentially overwhelming all of the guest operating systems. The hypervisor may be unable to detect and protect against the excessive virtual interrupts, because processing of virtual interrupts has been offloaded to the virtual interrupt controller.

SUMMARY OF ONE OR MORE EMBODIMENTS

Embodiments are disclosed in which a virtual interrupt filter provides an indication that an excessive number of virtual interrupts are being generated.

In some embodiments, a system for processing interrupts in a virtualized computing environment includes a virtual interrupt controller to provide virtual interrupts from peripherals to virtual machines. The system also includes a virtual interrupt filter that has an estimator circuit to provide an estimate of what proportion of interrupts from one or more of the peripherals are virtual interrupts.

In some embodiments, a method of processing interrupts in a virtualized computing system includes providing virtual interrupts from peripherals to virtual machines through a virtual interrupt controller and generating an estimate of what proportion of interrupts from one or more of the peripherals are virtual interrupts. The method further includes determining that the estimate satisfies a criterion and, in response, blocking incoming interrupts.

BRIEF DESCRIPTION OF THE DRAWINGS

The present embodiments are illustrated by way of example and are not intended to be limited by the figures of the accompanying drawings.

Like reference numerals refer to corresponding parts throughout the figures and specification.

DETAILED DESCRIPTION

Reference will now be made in detail to various embodiments, examples of which are illustrated in the accompanying drawings. In the following detailed description, numerous specific details are set forth in order to provide a thorough understanding of the disclosure. However, some embodiments may be practiced without these specific details. In other instances, well-known methods, procedures, components, and circuits have not been described in detail so as not to unnecessarily obscure aspects of the embodiments.

Figure 1:
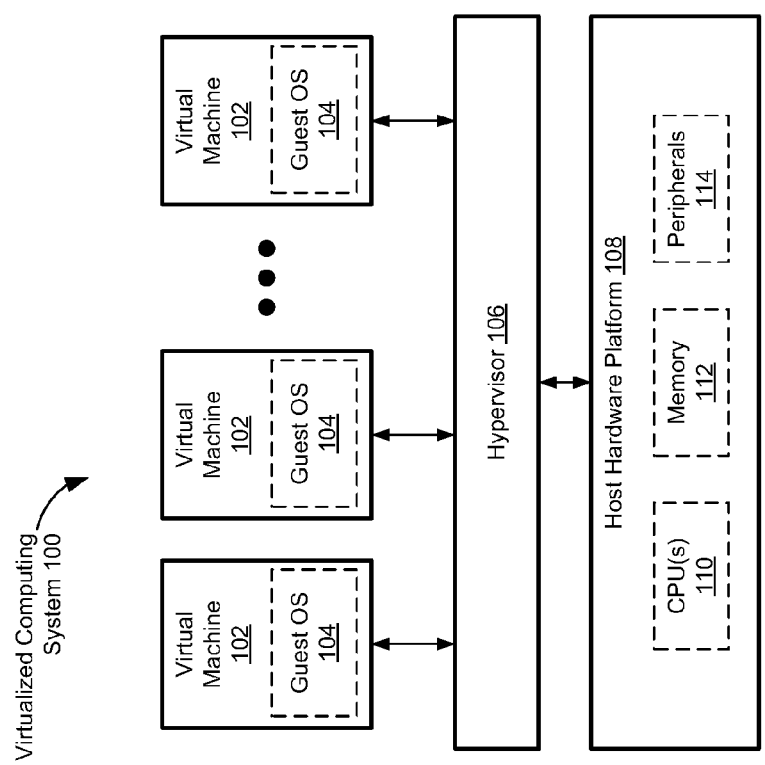
FIG. 1 is a block diagram of a virtualized computing system in accordance with some embodiments.

FIG. 1 is a block diagram of a virtualized computing system 100 in accordance with some embodiments. The virtualized computing system 100, which may also be referred to as a virtualized computing environment, is based on a host hardware platform 108. A hypervisor 106 runs on the host hardware platform 108. The hypervisor 106 provides a plurality of virtual machines 102 with shared access to the hardware resources of the host hardware platform 108. The shared hardware resources of the host hardware platform 108 include one or more central processing units (CPUs) 110, memory 112, and peripherals 114. The hypervisor 106 thus allows multiple virtual machines 102 to run on a single set of hardware resources in a single host hardware platform 108. Each virtual machine 102, which may also be referred to as a guest virtual machine, runs a guest operating system (OS) 104, on which various applications may be run.

Figure 2A:
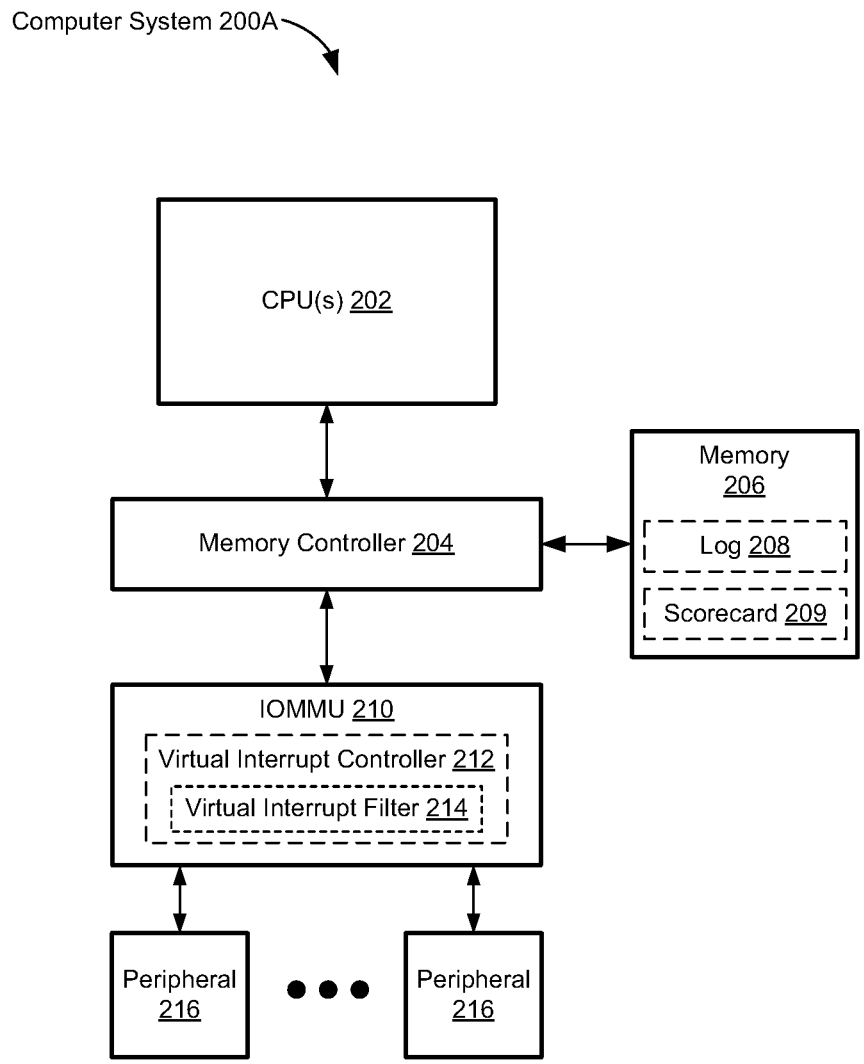
FIGS. 2A and 2B are block diagrams of computer systems in which the virtualized computing system of FIG. 1 may be implemented in accordance with some embodiments.

FIG. 2A is a block diagram of a computer system 200A in which the virtualized computing system 100 (FIG. 1) may be implemented in accordance with some embodiments. The computer system 200A is an example of the host hardware platform 108 (FIG. 1). The computer system 200A includes one or more CPUs 202, memory 206, and peripherals 216, which are respective examples of the CPU(s) 110, memory 112, and peripherals 114 (FIG. 1). The one or more CPUs 202 may each include one or more processor cores. The memory 206 includes main memory and may include one or more levels of cache memory. (The one or more CPUs 202 may also include one or more levels of cache memory.) In some embodiments, the main memory is implemented in dynamic random access memory (DRAM) and the one or more levels of cache memory are implemented in static random access memory (SRAM). Examples of peripherals 114 include, but are not limited to, network interface cards (NICs), other input/output (I/O) devices, and storage devices (e.g., hard-disk drives, solid-state drives such as flash drives, etc.).

A memory controller 204 couples the one or more CPUs 202 to the memory 206, thereby providing the one or more CPUs 202 with access to the memory 206.

The peripherals 216 are coupled to an input/output memory management unit (IOMMU) 210, which is coupled to the memory controller 204. The IOMMU 210 and memory controller 204 thus couple the peripherals 216 to the one or more CPUs 202 and to the memory 206. The IOMMU 210 may also be referred to as a peripheral MMU, a system MMU, a translation agent system, or virtualization technology for directed I/O (Vt-d). The IOMMU 210 performs address translation for the peripherals 216: it translates virtual addresses provided by the peripherals 216 into physical addresses in the memory 206. The peripherals 216 may use these physical addresses to perform direct memory access (DMA) in the memory 206. The IOMMU 210 also may support direct assignment of peripherals 216 to guest operating systems 104 (FIG. 1). For example, a peripheral 216 may be split into multiple virtual peripherals, each of which is assigned to a respective guest operating system 104 in a respective virtual machine 102.

The peripherals 216 generate interrupts to indicate the occurrence of events that merit action by the one or more CPUs 202. These interrupts include virtual interrupts and physical interrupts. Virtual interrupts are directed to guest operating systems 104 in respective virtual machines 102 (FIG. 1). For example, a virtual peripheral may generate a virtual interrupt directed to its respective guest operating system 104. Physical interrupts are directed to other software besides the guest operating systems 104. For example, some (e.g., most) physical interrupts are directed to the hypervisor 106 (FIG. 1). Another example of physical interrupts is system management interrupts (SMIs), which are directed to software associated with a system management mode (SMM). SMIs are used to indicate the occurrence of extreme events (e.g., thermal overload or loss of power) that merit immediate attention by the one or more CPUs 202.

The IOMMU 210 includes a virtual interrupt controller 212, implemented in hardware, that handles virtual interrupts: virtual interrupts are delivered to their target guest operating systems 104 through the virtual interrupt controller 212. (While the virtual interrupt controller 212 is included in the IOMMU 210 in the example of FIG. 2A, it may be located elsewhere between the peripherals 216 and the one or more CPUs 202.) The virtual interrupt controller 212 offloads delivery of virtual interrupts from the hypervisor 106 (and thus from the one or more CPUs 202), thereby improving performance and efficiency of the computer system 200A. The virtual interrupt controller 212 is distinct from a programmable interrupt controller (PIC, not shown in FIG. 2A for simplicity) that handles physical interrupts and may be integrated with the one or more CPUs 202. The functionality of the virtual interrupt controller 212 may be a superset of the functionality of the PIC, but for virtual interrupts instead of physical interrupts.

An attacking program (e.g., a computer virus), bug, or other anomaly may cause one or more peripherals 216 to generate an excessive number of virtual interrupts. For example, a denial-of-service attack may occur through a peripheral 216, or a coordinated denial-of-service attack may occur through multiple peripherals 216. Each interrupt may take thousands of CPU cycles for software to service. The excessive virtual interrupts therefore may degrade the performance not only of the virtual machine 102 to which the excessive virtual interrupts are directed, but other virtual machines 102 in the virtualized computing system 100 (FIG. 1). Forward progress of applications running on the virtual machines 102 may slow or halt. The hypervisor 106 may be unable to detect the excessive number of virtual interrupts and react accordingly, because processing of virtual interrupts has been offloaded from the hypervisor 106 to the virtual interrupt controller 212.

Figure 5:
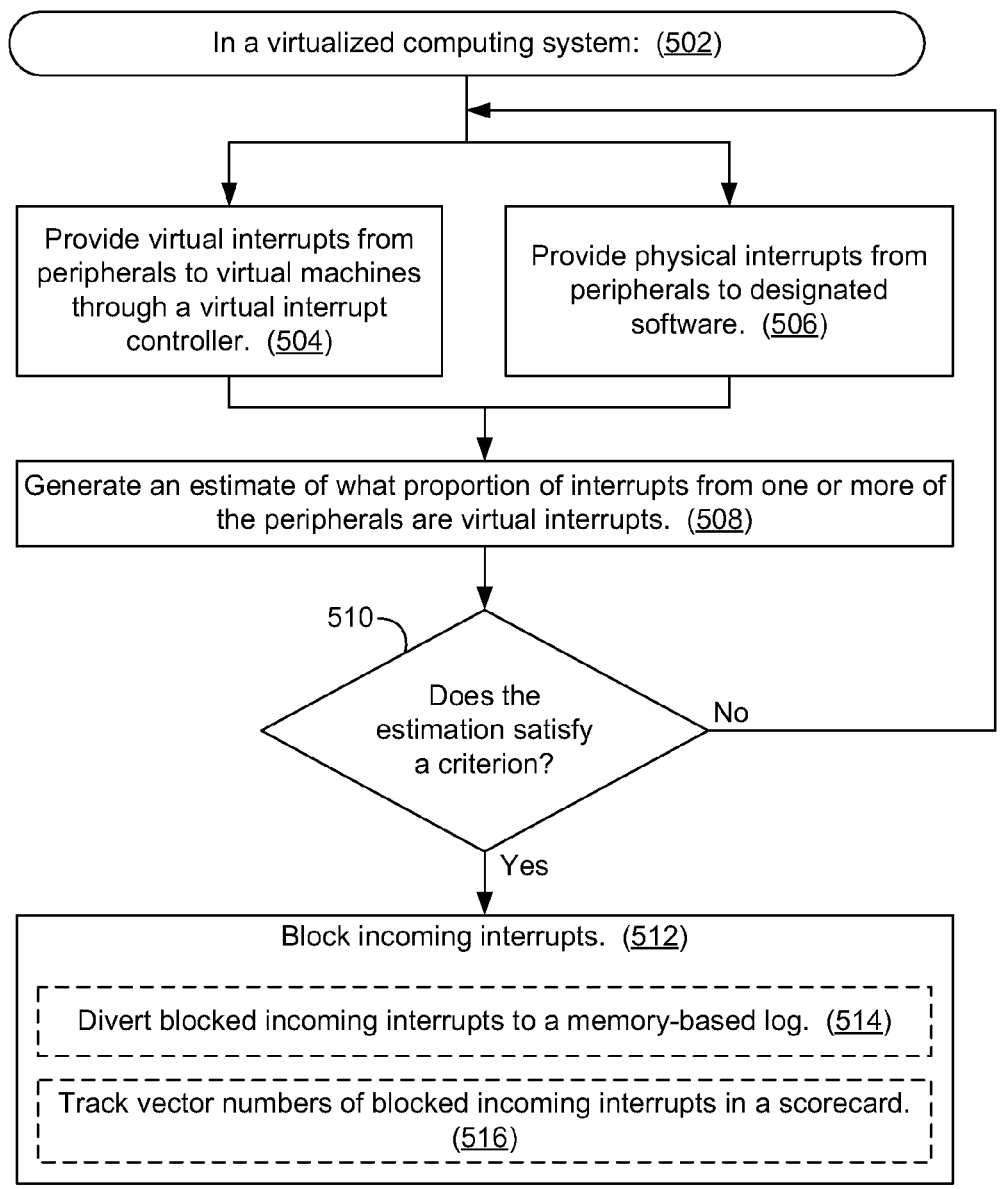
FIG. 5 is a flowchart showing a method of processing interrupts in accordance with some embodiments.

The virtual interrupt controller 212 therefore includes a virtual interrupt filter 214 that can provide an indication that one or more malfunctioning peripherals 216 are generating an excessive number of virtual interrupts (e.g., as a result of a bug or a denial-of-service attack). (Alternatively, the virtual interrupt filter 214 may be external to the virtual interrupt controller 212.) In response, delivery of interrupts (e.g., of all interrupts accessible to the virtual interrupt filter 214, or a portion thereof) may be blocked. In some embodiments, blocked interrupts are stored in a log 208 in the memory 206. For example, the log 208 stores a timestamp for each blocked interrupt, as well as the blocked interrupt itself, or one or more attributes of the blocked interrupt. Alternatively, or in addition, a scorecard 209 in the memory 206 tracks vector numbers of blocked interrupts. The vector number of an interrupt indicates the software to which the interrupt is directed, and thus provides either an indication of the peripheral 216 that generated the interrupt or an indication of a group of peripherals 216 that includes the peripheral 216 that generated the interrupt. For example, a vector number may indicate that an interrupt is directed to a disk handler and thus that the interrupt originated from a disk drive associated with the disk handler. Use of the log 208 and scorecard 209 is described further below with respect to the method 500 (FIG. 5).

In some embodiments, the memory controller 204 is integrated with the one or more CPU(s) 202, such that it is situated on the same semiconductor die (and thus the same chip) as the one or more CPU(s) 202. Alternatively, the memory controller 204 may be situated on a separate chip from the one or more CPU(s) 202. The IOMMU 210, virtual interrupt controller 212, and/or virtual interrupt filter 214 may be situated on the same chip as the memory controller 204 and/or the one or more CPU(s) 202, or on a different chip.

Figure 2B:
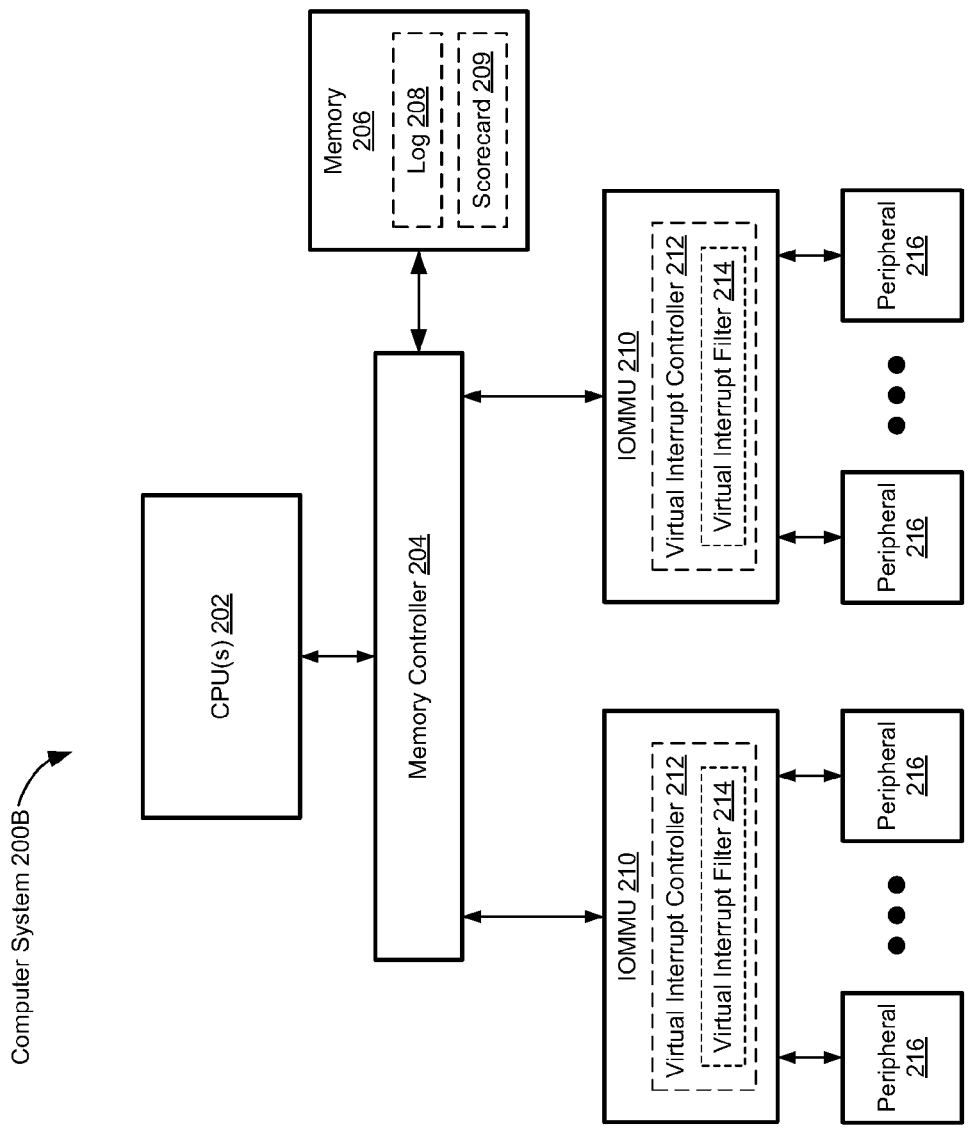

FIG. 2B is a block diagram of another computer system 200B in which the virtualized computing system 100 (FIG. 1) may be implemented in accordance with some embodiments. The computer system 200B is another example of the host hardware platform 108 (FIG. 1). In the computer system 200B, a first group of peripherals 216 is coupled to a first IOMMU 210 and a second group of peripherals 216 is coupled to a second IOMMU 210. The first and second IOMMUs 210 are coupled to the memory controller 204 and thereby to the one or more CPUs 202 and the memory 206. A first virtual interrupt controller 212 handles virtual interrupts from the first group of peripherals 216, while a second virtual interrupt controller 212 handles virtual interrupts from the second group of peripherals 216. A first virtual interrupt filter 214 in the first virtual interrupt controller 212 can detect excessive virtual interrupts generated in the first group of peripherals 216. Likewise, a second virtual interrupt filter 214 in the second virtual interrupt controller 212 can detect excessive virtual interrupts generated in the second group of peripherals 216. Interrupts from each group of peripherals 216 may be blocked in response to detection of excessive interrupts by the corresponding virtual interrupt filter 214.

While FIGS. 2A and 2B show a single virtual interrupt filter 214 in each IOMMU 210, there may be multiple virtual interrupt filters 214 in each IOMMU 210, each coupled to a defined set of one or more peripherals 216. For example, there may be a distinct virtual interrupt filter 214 for each peripheral 216, or a distinct virtual interrupt filter 214 for each virtualized peripheral.

The computer systems 200A and 200B are merely examples of computer systems used to implement the virtualized computing system 100 (FIG. 1); other examples are possible. For example, a computer system may include more than two IOMMUs 210, each coupled to a respective group of peripherals 216 and including a respective virtual interrupt controller 212 and virtual interrupt filter 214. Each IOMMU 210 may be coupled to respective peripherals 216 through an I/O hub, which may include integrated peripherals 216.

Figure 3A:
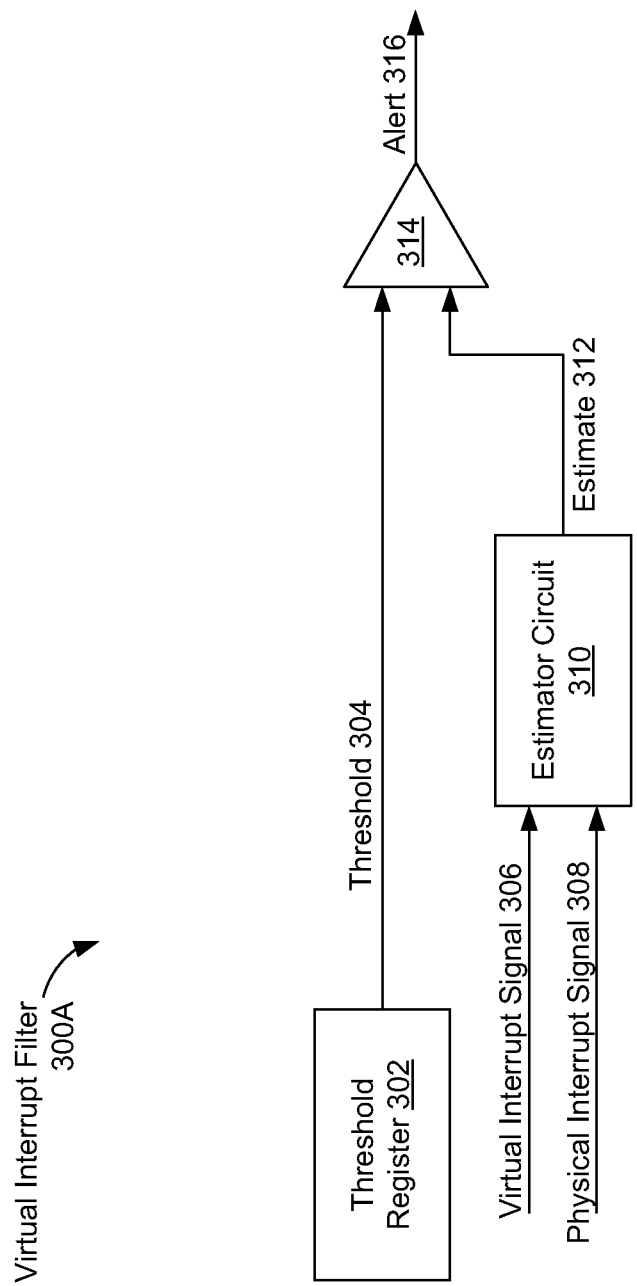
FIGS. 3A-3F are circuit diagrams of examples of virtual interrupt filters in accordance with some embodiments.

FIG. 3A is a circuit diagram of a virtual interrupt filter 300A, which is an example of a virtual interrupt filter 214 (FIGS. 2A-2B) in accordance with some embodiments. The virtual interrupt filter 300A includes a threshold register 302, an estimator circuit 310, and a comparator 314. The estimator circuit receives as inputs a virtual interrupt signal 306 and a physical interrupt signal 308. In some embodiments, the virtual interrupt signal 306 and physical interrupt signal 308 are not actual interrupts, but instead indicate the arrival of a corresponding type of interrupt (i.e., an incoming interrupt, which is also referred to as an upstream interrupt) from a peripheral 216. For example, the virtual interrupt signal 306 is a single-bit signal that is asserted in response to arrival of a virtual interrupt and is otherwise de-asserted. Similarly, the physical interrupt signal 308 is a single-bit signal that is asserted in response to arrival of a physical interrupt and is otherwise de-asserted. If there is a single virtual interrupt filter 300A in an IOMMU 210, the signals 306 and 308 indicate the arrival of interrupts from any of the peripherals 216 coupled to the IOMMU 210. If a virtual interrupt filter 300A is specific to a defined set of one or more peripherals 216 (e.g., to a virtual peripheral), the signals 306 and 308 indicate the arrival of interrupts from the defined set (e.g., from the virtual peripheral). The signals 306 and 308 may be set to a logic-high value ('1') when asserted and a logic-low value ('0') when de-asserted, or vice-versa. The virtual and physical interrupt signals 306 and 308 may be generated based on a bit in the interrupts that specifies whether the interrupts are virtual or physical.

The estimator circuit 310 generates an estimate 312 of what proportion of interrupts are virtual interrupts. In some embodiments, the estimate 312 is an estimated fraction of interrupts that are virtual interrupts. In some other embodiments, the estimate 312 is the complement of an estimated fraction of interrupts that are virtual interrupts (i.e., is the estimated fraction of interrupts that are physical interrupts, which effectively indicates the fraction that are virtual interrupts). The estimate 312 is a value having a specified number of bits; the value varies between 0 and N, where N is the largest number allowed by the specified number of bits. A value of 0 indicates that 0% of the interrupts are estimated to be of a particular type, while a value of N indicates that 100% of the interrupts are estimated to be of the particular type.

The threshold register 302 stores a threshold value 304 against which the estimate 312 is to be compared. The threshold value 304 and estimate 312 are multi-bit values. In some embodiments, the threshold value 304 is software-configurable: software may write to the threshold register 302 to set the threshold value 304. The threshold register 302 provides the threshold value 304 to a first input of the comparator 314; the estimator circuit 310 provides the estimate 312 to a second input of the comparator 314. For example, the comparator 314 periodically samples the threshold register 302 and the estimator circuit 310. The comparator 314 determines whether the estimate 312 satisfies a criterion (e.g., a pre-defined criterion) with respect to the threshold value 304. Satisfaction of the criterion indicates an excessive number of virtual interrupts. For example, if the estimate 312 is an estimated fraction of interrupts that are virtual interrupts, then the comparator 314 determines whether the estimate 312 is greater than (or greater than or equal to) the threshold value 304. If the estimate 312 is the complement of an estimated fraction of interrupts that are virtual interrupts, then the comparator 314 determines whether the estimate 312 is less than (or less than or equal to) the threshold value 304. The comparator 314 asserts an alert signal 316 in response to determining that the estimate 312 satisfies the criterion. If the estimate 312 does not satisfy the criterion, the alert signal 316 remains de-asserted.

In some embodiments, the comparator 314 is implemented as a binary decoder. The threshold register 302 stores a threshold value 304 that represents a binary logarithm of the actual threshold value. The comparator 314 determines whether a bit of the estimate 312 as specified by the comparator 314 is '1' (or alternatively, '0'); if so, the criterion is satisfied and the alert signal is asserted.

In some embodiments, the alert signal 316 is a dedicated interrupt: the comparator 314 asserts the alert signal by generating an interrupt. For example, the alert signal 316 may be a system management interrupt (SMI) or a message-signaled interrupt (MSI).

The threshold value 304 may vary depending on the type of computer system. For example, a real-time system may have a lower threshold value 304 than a general-purpose server, assuming that the estimate 304 is an estimated fraction of interrupts that are virtual interrupts. The general-purpose server may be able to provide acceptable service during a low-grade denial-of-service attack, while the real-time system cannot. The lower threshold value 304 for the real-time system reflects this difference in capability between the two systems.

Figure 3B:
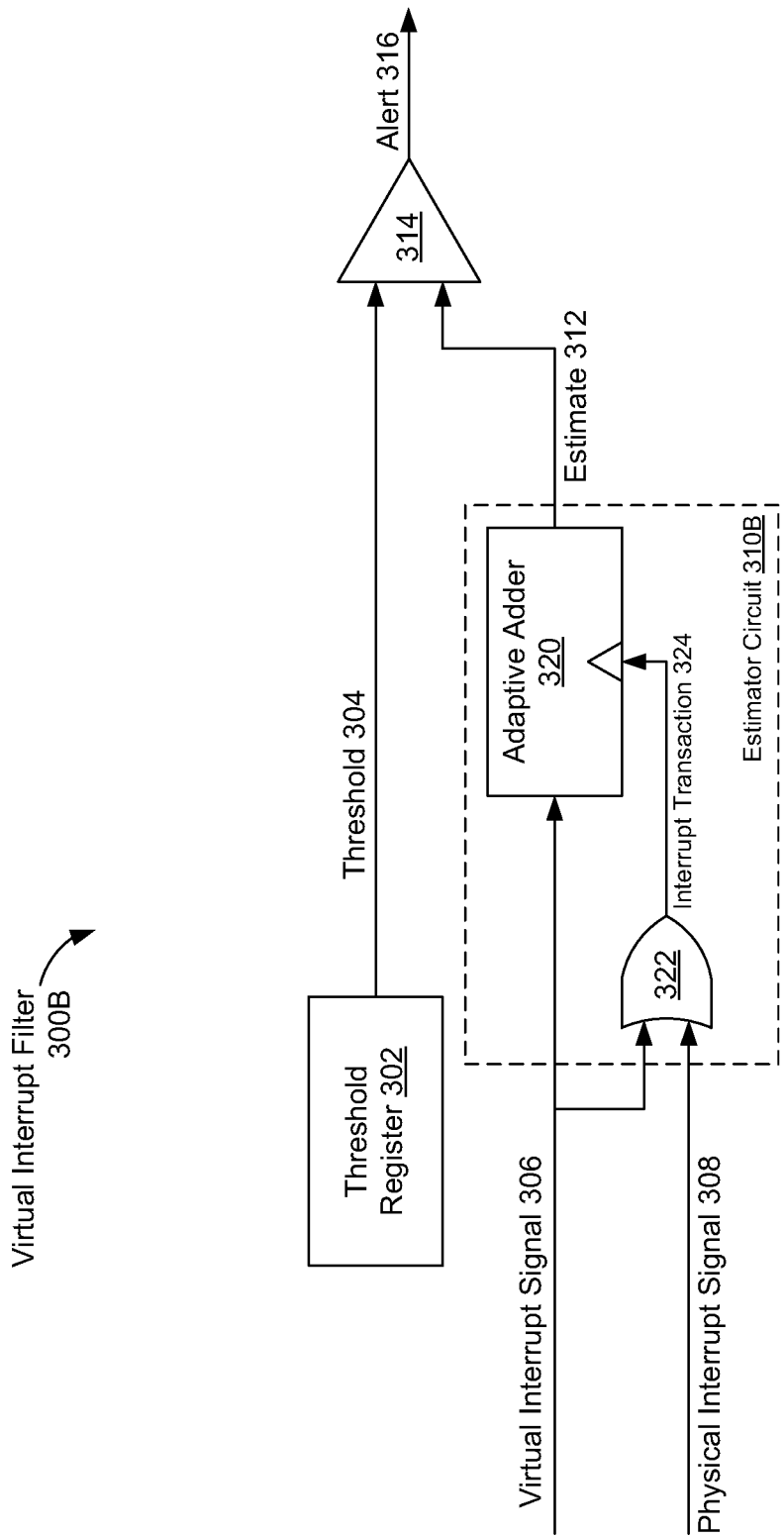

FIG. 3B is a block diagram of a virtual interrupt filter 300B in accordance with some embodiments. The virtual interrupt filter 300B is an example of the virtual interrupt filter 300A (FIG. 3A) and thus of a virtual interrupt filter 214 (FIGS. 2A and 2B), and includes an estimator circuit 310B that is an example of the estimator circuit 310 (FIG. 3A). The estimator circuit 310B includes an OR gate 322 and an adaptive adder circuit 320. The virtual interrupt signal 306 is provided to a signal input of the adaptive adder circuit 320. The virtual interrupt signal 306 and the physical interrupt signal 308 are provided to respective inputs of the OR gate 322, which provides an interrupt transaction signal 324 to a clock input of the adaptive adder circuit 320. The interrupt transaction signal 324 is asserted in response to arrival of both virtual and physical interrupts, in accordance with OR logic. The adaptive adder circuit 320 provides as the estimate 312 a running average of an estimated fraction of interrupts that are virtual interrupts.

Figure 3C:
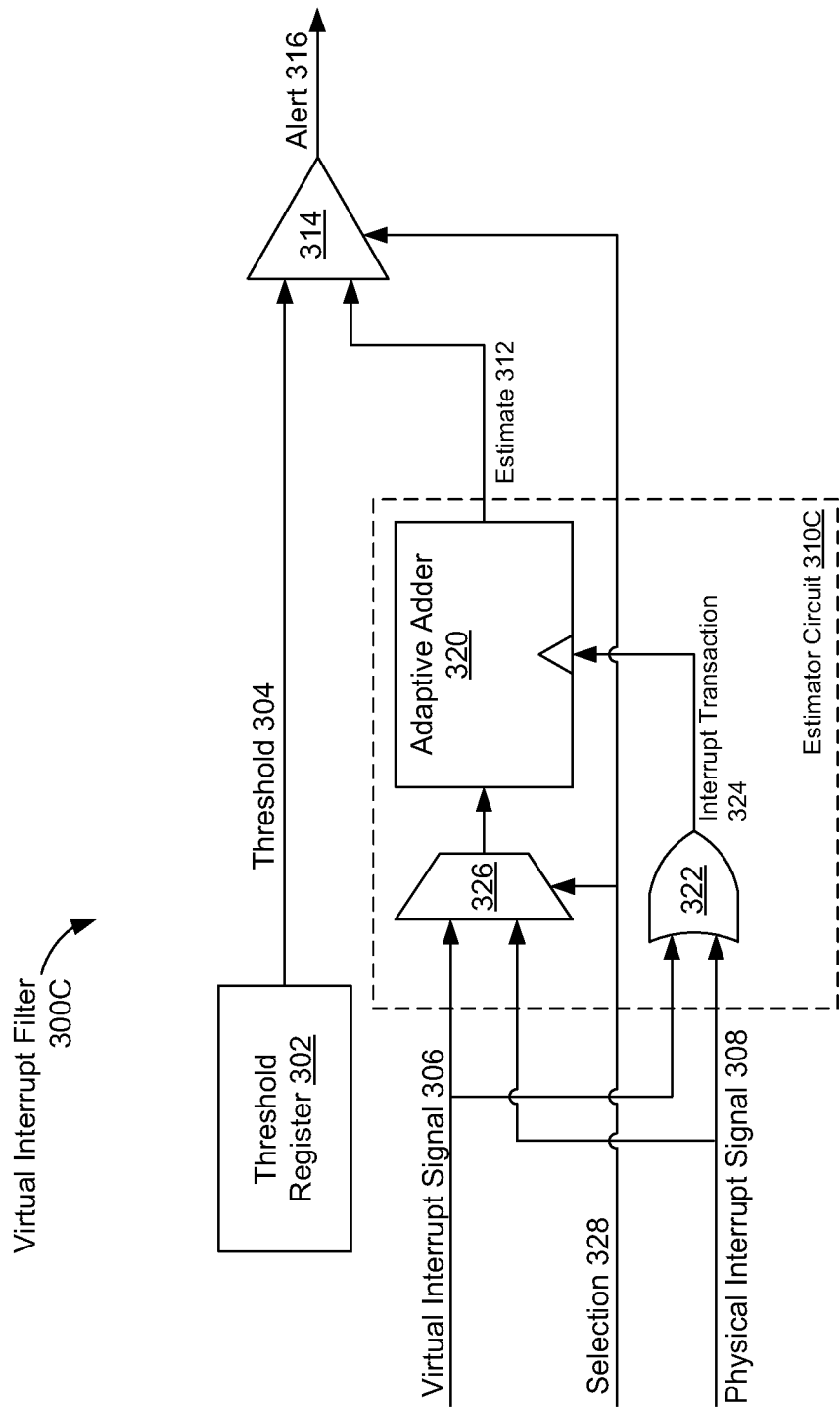

FIG. 3C is a block diagram of a virtual interrupt filter 300C in accordance with some embodiments. The virtual interrupt filter 300C is another example of the virtual interrupt filter 300A (FIG. 3A) and thus of a virtual interrupt filter 214 (FIGS. 2A and 2B), and includes an estimator circuit 310C that is another example of the estimator circuit 310 (FIG. 3A). The estimator circuit 310C includes the adaptive adder circuit 320 and OR gate 322, coupled as shown in FIG. 3B, and further includes a multiplexer (mux) 326. The virtual interrupt signal 306 and the physical interrupt signal 308 are provided to respective inputs of the mux 326. An output of the mux 326 provides either the virtual interrupt signal 306 or the physical interrupt signal 308 to the signal input of the adaptive adder circuit 320, as selected based on a selection signal 328 that controls the mux 326. The estimator circuit 310C thus is configurable to provide either a running average of an estimated fraction of interrupts that are virtual interrupts (e.g., if the mux 326 selects the virtual interrupt signal 306 as the signal input for the adaptive adder circuit 320) or a running average of the complement of an estimated fraction of interrupts that are virtual interrupts (e.g., if the mux 326 selects the physical interrupt signal 308 as the signal input for the adaptive adder circuit 320).

The comparator 314 of FIG. 3C is also configurable in accordance with the selection signal 328. For example, if the estimator circuit 310C is configured to provide a running average of an estimated fraction of interrupts that are virtual interrupts, the comparator 314 is configured to determine whether the estimate 312 is greater than (or greater than or equal to) the threshold value 304. If the estimator circuit 310C is configured to provide a running average of the complement of an estimated fraction of interrupts that are virtual interrupts, the comparator 314 is configured to determine whether the estimate 312 is less than (or less than or equal to) the threshold value 304. Also, software provides the threshold register 302 with an appropriate threshold value 304, depending on whether the virtual interrupt signal 306 or the physical interrupt signal 308 is selected as the signal input of the adaptive adder circuit 320.

Figure 4:
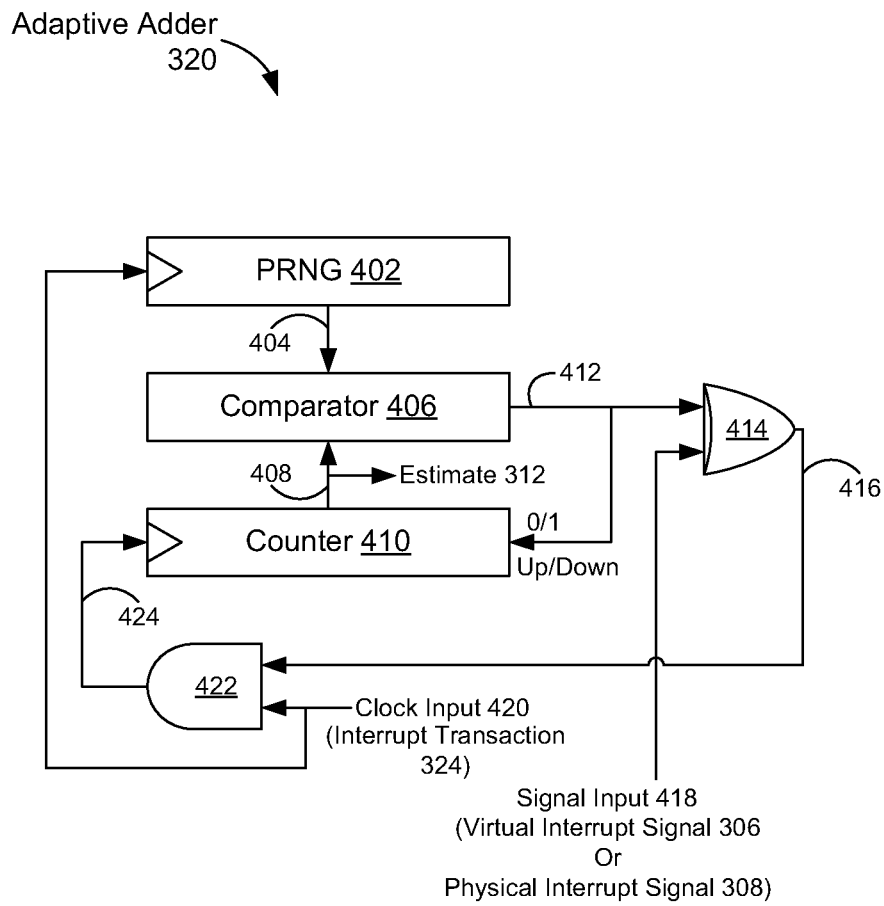
FIG. 4 is a circuit diagram of an adaptive adder circuit in accordance with some embodiments.

Attention is now directed to FIG. 4, which is a circuit diagram of the adaptive adder circuit 320 (FIGS. 3B-3C) in accordance with some embodiments. The adaptive adder circuit 320 is also described in U.S. Pat. No. 6,275,782, titled "Non-Intrusive Performance Monitoring," issued Aug. 14, 2001, which is incorporated by reference herein in its entirety.

In the adaptive adder circuit 320, a counter 410 provides a counter value 408 to a comparator 406. A pseudo-random number generator (PRNG) 402 (e.g., a linear-feedback shift register) generates a sequence 404 of pseudo-random numbers and provides the sequence 404 to the comparator 406. The comparator 406 compares the counter value 408 to respective pseudo-random numbers in the sequence 404 and outputs a compare signal 412 indicating the result of the comparison. If the counter value 408 is greater than or equal to a respective pseudo-random number in the sequence 404, the compare signal 412 equals '1'; otherwise, the compare signal 412 equals '0.' The compare signal 412 is provided to the counter 410 as an up/down count signal. When the compare signal 412 equals '1' (i.e., the counter value 408 is greater than or equal to a respective pseudo-random number in the sequence 404), the counter 410 is configured to count down (e.g., to decrement the counter value 408 by one). When the compare signal 412 equals '0' (i.e., the counter value 408 is less than the respective pseudo-random number in the sequence 404), the counter 410 is configured to count up (e.g., to increment the counter value 408 by one). The counter 410 does not actually count, however, unless its clock signal 424 is pulsed.

Either the virtual interrupt signal 306 or the physical interrupt signal 308 is provided to the adaptive adder circuit 320 as a signal input 418. The signal input 418 and the compare signal 412 are provided to respective inputs of an XOR gate 414. When the compare signal 412 differs from the signal input 418, the output 416 of the XOR gate 414 equals '1'; otherwise the output 416 equals '0', in accordance with XOR logic. The output 416 is provided to a first input of an AND gate 422. The interrupt transaction signal 324 is provided to a second input of the AND gate 422 as a clock input 420. (The interrupt transaction signal 324 also clocks the PRNG 402). The AND gate 422, in conjunction with the XOR gate 414, thus provides the interrupt transaction signal 324 to the counter 410 as a clock signal 424 when the compare signal 412 does not equal the signal input 418, but not when the compare signal 412 equals the signal input 418. Counting by the counter 410 therefore occurs when an interrupt arrives and the compare signal 412 does not equal the signal input 418. Counting by the counter 410 is disabled when the compare signal 412 equals the signal input 418.

Over time, the counter value 408 converges to the fraction of interrupts that are virtual interrupts (if the signal input 418 is the virtual interrupt signal 306) or physical interrupts (if the signal input 418 is the physical interrupt signal 308). The counter value 408 is provided as the estimate 312.

Figure 3D:
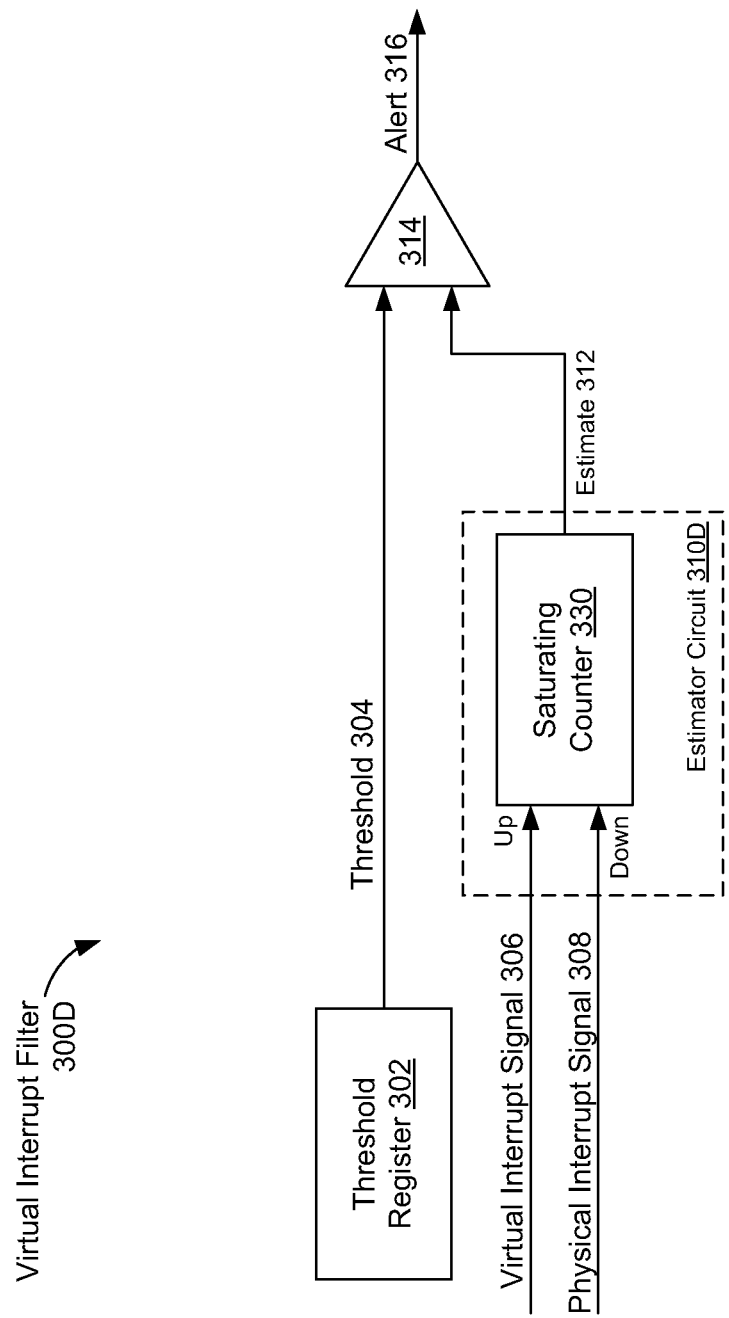

In some embodiments, the estimator circuit 310 (FIG. 3A) is implemented using a counter instead of an adaptive adder circuit 320. FIG. 3D is a block diagram of a virtual interrupt filter 300D in which an estimator circuit 310D includes a saturating counter 330 in accordance with some embodiments. The virtual interrupt filter 300D is yet another example of the virtual interrupt filter 300A (FIG. 3A) and thus of a virtual interrupt filter 214 (FIGS. 2A and 2B), and the estimator circuit 310D is yet another example of the estimator circuit 310 (FIG. 3A). The saturating counter 330 is an up/down counter that counts up in response to assertion of the virtual interrupt signal 306 and counts down in response to assertion of the physical interrupt signal 308. The saturating counter 330 does not increment above a specified maximum value, and thus saturates at the specified maximum value. The saturating counter 330 also does not decrement below zero. The value of the saturating counter 330 is provided as the estimate 312; in this example, the estimate 312 indicates the fraction of interrupts that are virtual interrupts. Alternatively, the up/down inputs of the saturating counter 330 may be switched, such that the saturating counter 330 counts up in response to assertion of the physical interrupt signal 308 and counts down in response to assertion of the virtual interrupt signal 306. In this alternative example, the estimate 312 indicates the complement of the fraction of interrupts that are virtual interrupts. While the saturating counter 330 is shown as an up/down counter, other examples are possible. For example, the saturating counter 330 may be a count-up/shift-down counter that provides an exponential decay for the estimate 312.

Figure 3E:
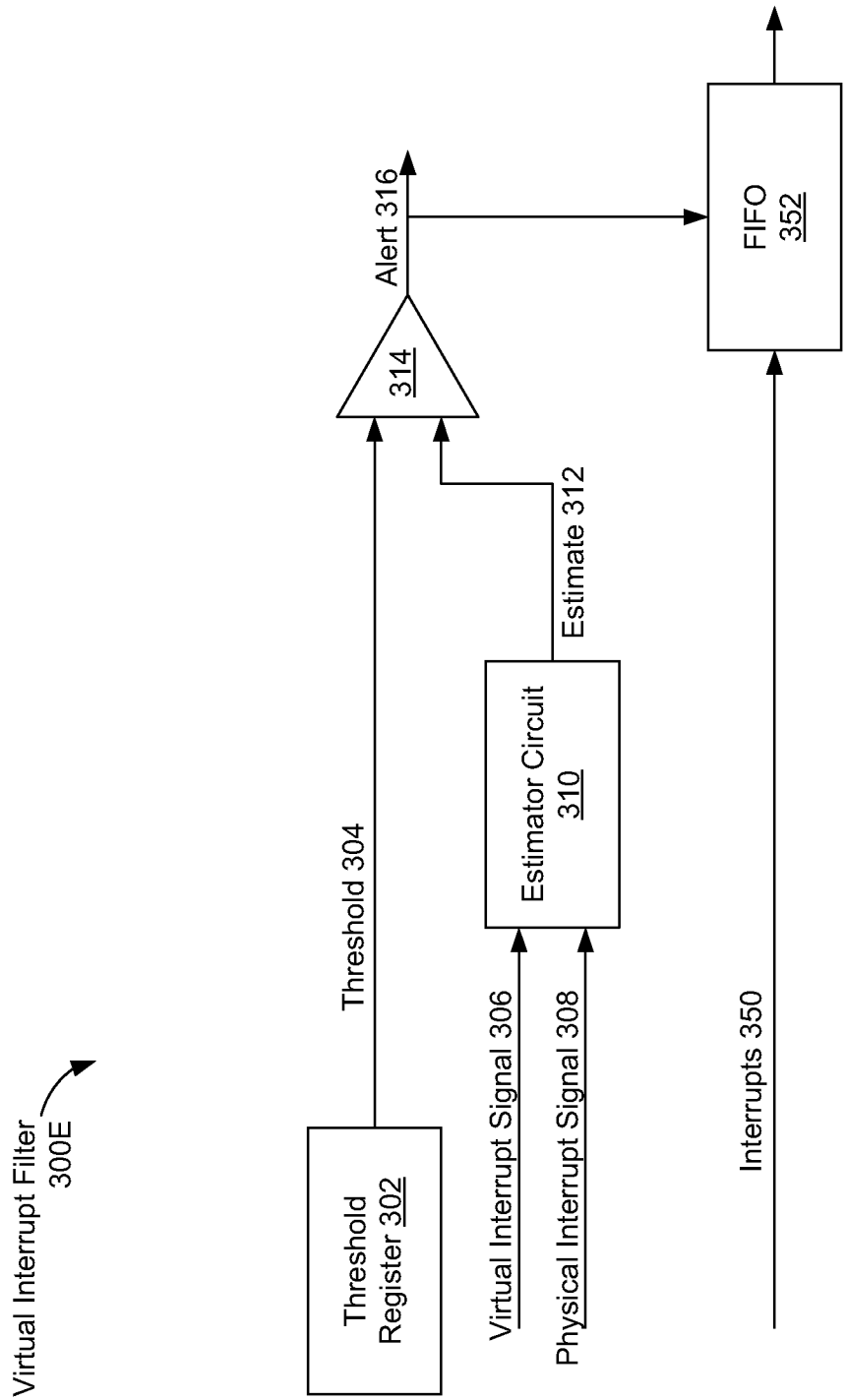

FIG. 3E is a circuit diagram of a virtual interrupt filter 300E, which corresponds to the virtual interrupt filter 300A (FIG. 3A) and further includes a first-in-first-out (FIFO) buffer 352 in accordance with some embodiments. The virtual interrupt filter 300E, like the virtual interrupt filter 300A, is an example of a virtual interrupt filter 214 (FIGS. 2A-2B). In some embodiments, the FIFO buffer 352 is implemented using a series of registers or a circular buffer with entries stored in the memory 206 (FIGS. 2A-2B). The FIFO buffer 352 samples a specified number (e.g., tens, hundreds, or thousands) of interrupts 350. The FIFO buffer 352 stops sampling the interrupts 350 and holds its data in response to assertion of the alert signal 316. The interrupts 350 stored in the FIFO buffer 352 thus precede assertion of the alert signal 316 The contents of the FIFO buffer 352 may subsequently be inspected to identify the one or more peripherals 216 responsible for the excessive virtual interrupts.

Figure 3F:
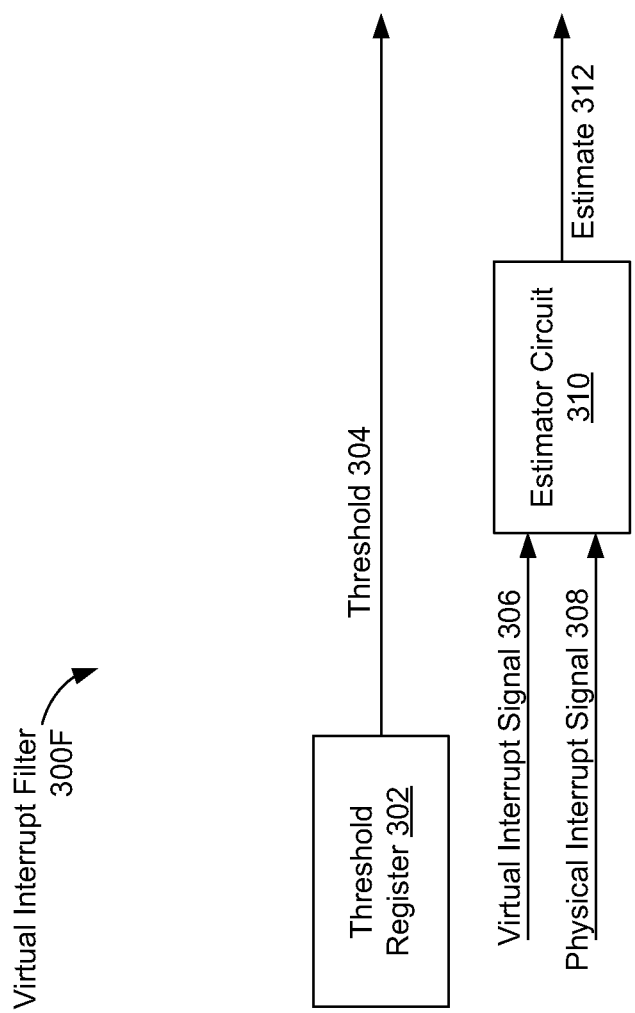

In some embodiments, the comparator 314 may be omitted from a virtual interrupt filter (e.g., a virtual interrupt filter 214, FIGS. 2A-2B), as shown for a virtual interrupt filter 300F in FIG. 3F. Instead, software may periodically read the value of the estimate 312 from the estimator circuit 310. The software may also read the threshold value 304 from the threshold register 302 and compare the estimate 312 to the threshold value 304 to determine whether to block incoming interrupts. In some embodiments, the threshold register 302 is also omitted; instead, the software compares the estimate 312 to a threshold value stored elsewhere (e.g., in memory 206, FIGS. 2A-2B).

FIG. 5 is a flowchart showing a method 500 of processing interrupts in accordance with some embodiments. The method 500 is performed (502) in the virtualized computing system 100 (FIG. 1), and thus may be performed by the computer system 200A (FIG. 2A) or 200B (FIG. 2B).

In the method 500, virtual interrupts are provided (504) from peripherals 216 to virtual machines 102 through a virtual interrupt controller 212. Physical interrupts are provided (506) from peripherals 216 to designated software (e.g., to the hypervisor 106 and/or SMM software).

An estimate 312 (FIGS. 3A-3F, FIG. 4) is generated (508) of what proportion of interrupts from one or more of the peripherals 216 are virtual interrupts. In some embodiments, the estimate 312 is an estimate (e.g., a running average) of the fraction of interrupts that are virtual interrupts. In some embodiments, the estimate 312 is an estimate (e.g., a running average) of the complement of the fraction of interrupts that are virtual interrupts. The estimate may be generated in hardware by a virtual interrupt filter 214 (e.g., one of virtual interrupt filters 300A-300F, FIGS. 3A-3F).

A determination is made (510) as to whether the estimate 312 satisfies a criterion (e.g., a predefined criterion). Satisfaction of the criterion indicates that an excessive number of virtual interrupts are being generated. In some embodiments, this determination is made in hardware (e.g., by the comparator 314, FIGS. 3A-3E). In other embodiments, this determination is made in software (e.g., as described with respect to FIG. 3F).

If the estimate 312 does not satisfy the criterion (510-No), performance of the operations 504, 506, 508, and 510 continues.

If the estimate 312 satisfies the criterion (510-Yes), incoming interrupts (e.g., upstream interrupts from one or more peripherals 216) are blocked (512). For example, all incoming virtual interrupts from the one or more peripherals are blocked. At least a portion of incoming physical interrupts from the one or more peripherals may also be blocked. In some embodiments, all physical interrupts except for a predefined set of interrupts (e.g., including SMIs and non-maskable interrupts (NMIs)) are also blocked. Blocking interrupts reduces the load associated with processing interrupts and allows software to take steps to recover from the excessive number of virtual interrupts.

In some embodiments, an alert signal 316 (FIGS. 3A-3E) is asserted in response to determining (510-Yes) that the estimate 312 satisfies the criterion. The alert signal 316 triggers blocking (512) of the incoming interrupts. In some embodiments, asserting the alert signal 316 includes generating an interrupt. For example, the alert signal 316 may be an SMI that triggers a transition into SMM. SMM allows the manufacturer (e.g., the original equipment manufacturer or OEM) of a computer system 200A or 200B to configure the response to excessive generation of virtual interrupts.

In some embodiments, blocked interrupts are diverted (514) to the log 208 (FIGS. 2A-2B). Software may then examine the log 208 to identify the one or more peripherals 216 generating the excessive virtual interrupts. Based on this identification, the software may perform a diagnosis of the root cause of the excessive interrupts. Also, the interrupts stored in the log 208 may be processed in a selective manner at a rate that does not unduly impact the performance of applications running on the virtual machines 102. Interrupts in the log 208 with vector numbers in a predefined set (e.g., interrupts that are considered system-critical, such as interrupts from disks and timers) may be prioritized for processing.

In some embodiments, vector numbers of blocked interrupts are tracked (516) in a scorecard 209 (FIGS. 2A-2B). For example, the scorecard 209 may include a bit for each possible vector number. When an interrupt with a particular vector number is blocked, the corresponding bit in the scorecard 209 is set (e.g., to '1'). Based on the vector numbers as tracked in the scorecard 209, software may identify peripherals 216 that generated the blocked interrupts, query the peripherals 216 regarding the blocked interrupts, and process the blocked interrupts accordingly, again at a rate that that does not unduly impact the performance of applications running on the virtual machines 102. Software may also analyze the vector numbers in the scorecard 209 as a first step in identifying the one or more peripherals 216 responsible for the excessive virtual interrupts.

While the method 500 includes a number of operations that appear to occur in a specific order, it should be apparent that the method 500 can include more or fewer operations, which can be executed serially or in parallel. An order of two or more operations may be changed, performance of two or more operations may overlap, and two or more operations may be combined into a single operation. For example, the operations 504, 506, 508, and 510 may be performed repeatedly in parallel on an ongoing basis.

Figure 6:
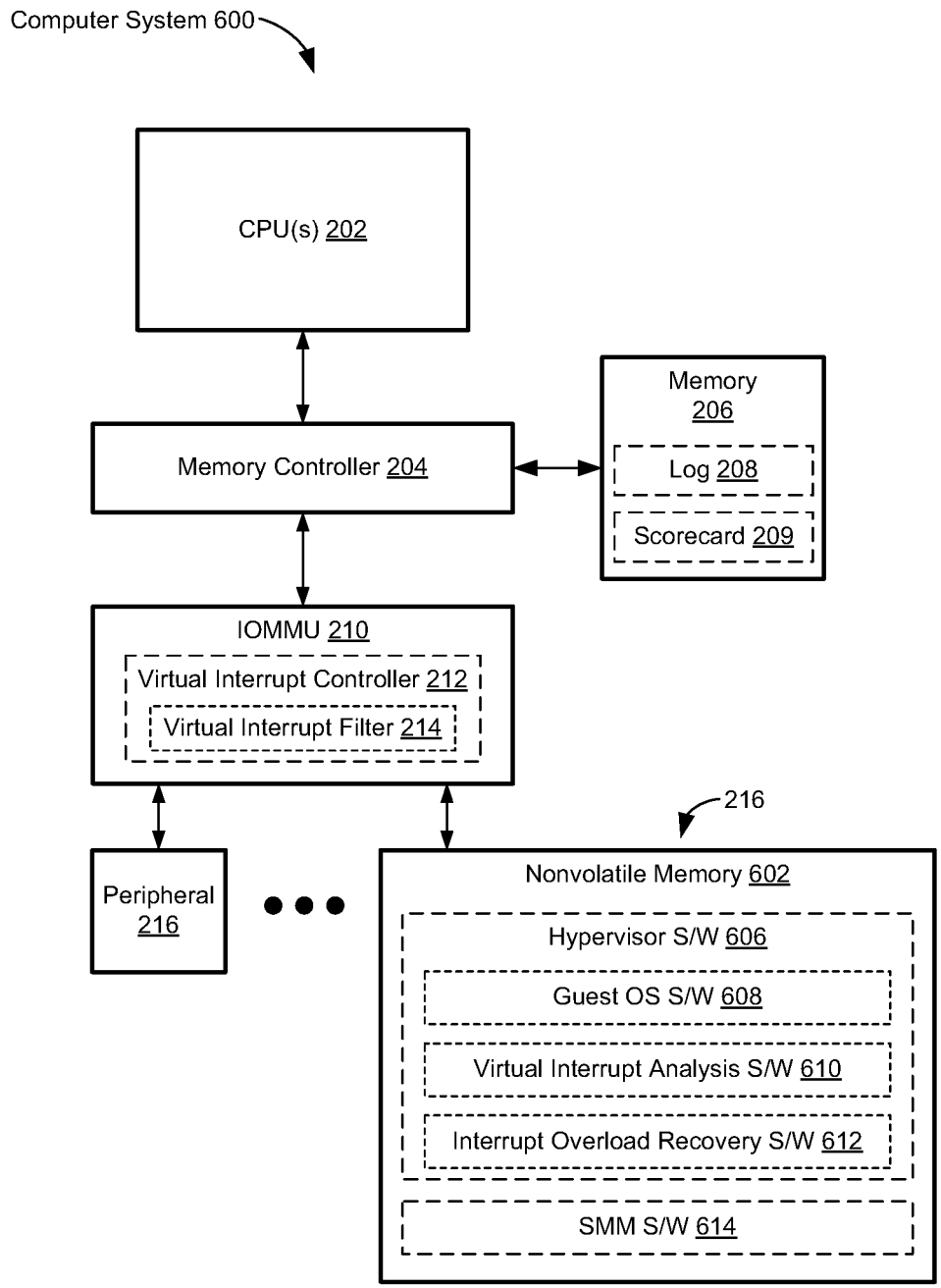
FIG. 6 is a block diagram of a computer system including nonvolatile memory in accordance with some embodiments.

FIG. 6 is a block diagram of a computer system 600 in which one of the peripherals 216 is a nonvolatile memory 602 in accordance with some embodiments. The computer system 600 is an example of a computer system 200A (FIG. 2A) and may be used to implement the virtualized computing system 100 (FIG. 1). The nonvolatile memory 602 includes a non-transitory computer-readable storage medium storing programs with instructions configured for execution by the one or more CPUs 202. These programs include hypervisor software 606 (e.g., for the hypervisor 106, FIG. 1), guest operating system software 608 (e.g., for the guest operating systems 104, FIG. 1), and SMM software 614 for operating in system management mode in response to an SMI.

These programs also include virtual interrupt analysis software 610, which may include instructions for blocking incoming interrupts in response to a determination (e.g., determination 510-Yes, FIG. 5) that the estimate 312 satisfies a criterion (e.g., in response to assertion of an alert signal 316). The virtual interrupt analysis software 610 also may include instructions for diverting blocked interrupts to the log 208 (FIGS. 2A-2B) and/or for maintaining the scorecard 209 (FIGS. 2A-2B), as well as for reading and analyzing the log 208, the scorecard 209, and/or the FIFO buffer 352 (FIG. 3E). In some embodiments, the virtual interrupt analysis software 610 includes instructions to read the estimate 312, instructions to read the threshold value 304 from the threshold register 302, and/or instructions to determine whether the estimate 312 satisfies the criterion (e.g., as described with respect to FIG. 3F). The virtual interrupt analysis software 610 may further include instructions for programming the threshold value 304 in the threshold register 302 and instructions for setting the value of the selection signal 328 (FIG. 3C).

These programs may further include interrupt overload recovery software 612, which includes instructions for recovering from an event in which a peripheral generates excessive virtual interrupts. For example, the interrupt overload recovery software 612 may include instructions for resetting the value of the saturating counter 330 (FIG. 3D) or the counter 410 in the adaptive adder circuit 320 (FIG. 4) to a specified value.

In the example of FIG. 6, the virtual interrupt analysis software 610 and interrupt overload recovery software 612 are included in the hypervisor software 606. Alternatively, one or both of the virtual interrupt analysis software 610 and interrupt overload recovery software 612 may be included in the SMM software 614 or shared between the hypervisor software 606 and SMM software 614. Other configurations are also possible.

The foregoing description, for purpose of explanation, has been described with reference to specific embodiments. However, the illustrative discussions above are not intended to be exhaustive or to limit all embodiments to the precise forms disclosed. Many modifications and variations are possible in view of the above teachings. The disclosed embodiments were chosen and described to best explain the underlying principles and their practical applications, to thereby enable others skilled in the art to best implement various embodiments with various modifications as are suited to the particular use contemplated.

What is claimed is:

1. A system for processing interrupts in a virtualized computing environment, the system comprising:
   a virtual interrupt filter comprising an estimator circuit to provide an estimate of what proportion of interrupts from one or more peripherals are virtual interrupts, the proportion representing a relationship between a number of virtual interrupts and a number of physical interrupts received from the one or more peripherals;
   wherein the system is arranged to conditionally block interrupts from one or more interrupt processors based at least in part on the estimate.

2. The system of claim 1, wherein the system further comprises a virtual interrupt controller to provide the virtual interrupts from peripherals to virtual machines.

3. The system of claim 2, wherein the virtual interrupt filter further comprises:
   a comparator to determine whether the estimate satisfies a criterion with respect to a threshold value and to assert an alert signal in response to determining that the estimate satisfies the criterion.

4. The system of claim 3, wherein the alert signal comprises an interrupt.

5. The system of claim 3, further comprising a memory-based log to which to divert virtual interrupts in response to assertion of the alert signal.

6. The system of claim 3, wherein virtual interrupts are to be blocked in response to assertion of the alert signal, the system further comprising a memory-based scorecard to track vector numbers of blocked virtual interrupts.

7. The system of claim 3, further comprising a first-in-first-out (FIFO) buffer to sample a specified number of interrupts that precede assertion of the alert signal.

8. The system of claim 2, wherein the estimator circuit comprises an adaptive adder circuit, the adaptive adder circuit comprising:
   a signal input to receive a first signal selected from the group consisting of a virtual interrupt signal asserted in response to virtual interrupts and a physical interrupt signal asserted in response to physical interrupts;
   a clock input to receive an interrupt transaction signal asserted in response to virtual interrupts and physical interrupts; and
   an output to provide the estimate.

9. The system of claim 8, wherein the adaptive adder circuit further comprises:
   a counter to provide a counter value to the output as the estimate;
   a pseudo-random number generator to provide a sequence of pseudo-random numbers;
   a comparator to perform comparisons of the counter value to respective pseudo-random numbers of the sequence, generate a compare signal indicating results of the comparisons, and provide the compare signal to the counter as an up/down count signal; and
   logic to provide the interrupt transaction signal to the counter as a clock signal when the compare signal does not equal the first signal and to disable counting by the counter when the compare signal equals the first signal.

10. The system of claim 2, wherein the estimator circuit comprises a saturating counter to store a counter value, the counter value being adjustable in a first direction in response to a virtual interrupt and adjustable in a second direction in response to a physical interrupt;
    wherein the saturating counter does not increment above a predefined value and does not decrement below zero.

11. The system of claim 2, further comprising:
    one or more processors; and
    memory storing one or more programs configured for execution by the one or more processors, the one or more programs comprising:
    instructions to read the estimate;
    instructions to determine whether the estimate satisfies a criterion; and
    instructions to block incoming interrupts in response to determining that the estimate satisfies the criterion.

12. The system of claim 1, wherein a virtual interrupt is an interrupt that is directed to a corresponding virtual machine and a physical interrupt is an interrupt that is directed to software other than a virtual machine.

13. A method of processing interrupts in a virtualized computing system, the method comprising:
    blocking incoming interrupts based on a proportion of interrupts from one or more peripherals that are virtual interrupts and a criterion, the proportion representing a relationship between a number of virtual interrupts and a number of physical interrupts received from the one or more peripherals.

14. The method of claim 13, further comprising:
    providing the virtual interrupts from peripherals to virtual machines through a virtual interrupt controller;
    generating an estimate of what proportion of interrupts from the one or more peripherals are virtual interrupts; and
    determining that the estimate satisfies the criterion;
    wherein the blocking is performed in response to the determining.

15. The method of claim 14, wherein the determining comprises:
    providing a threshold value stored in a register to a first input of a comparator;
    providing the estimate to a second input of the comparator; and
    in the comparator, asserting an alert signal based on a comparison of the estimate to the threshold value,
    wherein the alert signal triggers the blocking 16. The method of claim 14, further comprising, in response to the determining, tracking vector numbers of blocked incoming interrupts.

17. The method of claim 14, wherein generating the estimate comprises:
    providing to a signal input of an adaptive adder circuit a first signal selected from the group consisting of a virtual interrupt signal asserted in response to virtual interrupts and a physical interrupt signal asserted in response to physical interrupts;
    providing to a clock input of the adaptive adder circuit an interrupt transaction signal asserted in response to virtual interrupts and physical interrupts; and
    providing an output of the adaptive adder circuit as the estimate.

18. The method of claim 17, wherein generating the estimate comprises, in the adaptive adder circuit:
    generating a sequence of pseudo-random numbers;
    comparing a value of a counter to respective pseudo-random numbers of the sequence, to generate a compare signal indicating results of the comparing;
    providing the compare signal to the counter as an up/down count signal;
    providing the interrupt transaction signal to the counter as a clock signal when the compare signal does not equal the first signal, the clock signal being disabled when the compare signal equals the first signal; and adjusting the value of the counter in accordance with the up/down count signal and the clock signal.

19. The method of claim 14, wherein generating the estimate comprises:
incrementing a saturating counter in response to a virtual interrupt;
decrementing the saturating counter in response to a physical interrupt; and
providing a value of the saturating counter as the estimate;
wherein the saturating counter does not increment above a predefined value and does not decrement below zero.

20. A system for processing interrupts in a computer, comprising:
means for blocking incoming interrupts from one or more peripherals based on a proportion of interrupts from the one or more peripherals that are virtual interrupts and a criterion, the proportion representing a relationship between a number of virtual interrupts and a number of physical interrupts received from the one or more peripherals.

* * * * *